(12) United States Patent
Yang

(10) Patent No.: US 9,750,299 B2
(45) Date of Patent: Sep. 5, 2017

(54) METHOD FOR INTEGRALLY FORMING A SOLE WITH HOBNAILS

(71) Applicant: Teng-Jen Yang, Taichung (TW)

(72) Inventor: Teng-Jen Yang, Taichung (TW)

(*) Notice: Subject to any disclaimer, the term of this patent is extended or adjusted under 35 U.S.C. 154(b) by 645 days.

(21) Appl. No.: 14/459,313

(22) Filed: Aug. 14, 2014

(65) Prior Publication Data
US 2016/0044995 A1    Feb. 18, 2016

(51) Int. Cl.
| | | |
|---|---|---|
| B29C 45/44 | (2006.01) |
| A43B 5/00 | (2006.01) |
| A43B 13/22 | (2006.01) |
| A43B 13/26 | (2006.01) |
| B29D 35/12 | (2010.01) |
| B29D 35/14 | (2010.01) |
| B29C 45/16 | (2006.01) |

(52) U.S. Cl.
CPC ............ *A43B 5/001* (2013.01); *A43B 13/223* (2013.01); *A43B 13/26* (2013.01); *B29D 35/122* (2013.01); *B29D 35/128* (2013.01); *B29D 35/142* (2013.01); *B29D 35/148* (2013.01); *B29C 45/16* (2013.01); *B29C 45/4407* (2013.01); *B29C 2045/167* (2013.01); *B29C 2045/4414* (2013.01)

(58) Field of Classification Search
CPC .................. B29C 45/4407; B29C 2045/4414
USPC ................................................. 264/318, 336
See application file for complete search history.

(56) References Cited

U.S. PATENT DOCUMENTS

| | | | | |
|---|---|---|---|---|
| 5,526,954 A | * | 6/1996 | Georgiadis | .......... B29C 45/0017 220/268 |
| 7,726,047 B1 | * | 6/2010 | MacNeill | .............. A43B 1/0027 36/134 |
| 2003/0131502 A1 | * | 7/2003 | Terashima | .............. A43B 5/001 36/127 |
| 2015/0208755 A1 | * | 7/2015 | Rustam | .................. A43B 5/001 36/127 |

* cited by examiner

*Primary Examiner* — Jill Heitbrink
(74) *Attorney, Agent, or Firm* — Bruce Stone LLP; Joseph Bruce

(57) ABSTRACT

A method for integrally forming a sole with hobnails includes the following steps: providing a mold assembly, the mold assembly includes a sole forming member and a hobnail forming member, the hobnail forming member is movable with respect to the sole forming member; forming of sole and hobnails, injecting plastic material into the mold cavity to integrally form the sole and a hobnail; demolding the hobnail, moving the hobnail forming member with respect to the sole forming member to create a buffer space between the hobnail and the hobnail forming member; and demolding of the sole, taking the sole with the hobnail obtained by the previous step out of the mold assembly, wherein an arc-shaped paw portion of the hobnail is bent through the buffer space and then demolded.

2 Claims, 11 Drawing Sheets

METHOD FOR INTEGRALLY FORMING A SOLE WITH HOBNAILS

BACKGROUND OF THE INVENTION

Field of the Invention

The present invention relates to a method for forming a sole, and more particularly to a method for integrally forming a sole with hobnails.

Description of the Prior Art

Golf is an outdoor sport, in which players have to walk and swing a lot on the lawn. Most of the golf shoes are provided with hobnails in order to prevent slipping when walking on the lawn.

Conventional hobnails usually each include a plurality of paw portions formed at one side of a connecting portion, and the paw portions extend outward in a radial manner. The hobnails are normally screwed to the sole of the golf shoe in a direct or indirect manner, so as to enhance the gripping ability of the golf shoes, preventing slipping when the player swings the club.

However, walking or swinging motion of the player is likely to cause twist of the hobnails with respect to the sole, as a result, the hobnails will get loose or fall off of the sole. Hence, golf shoes manufactures tried every way to fix the hobnails to the sole directly or indirectly, but so far most of the ways are found ineffective to prevent the hobnails from getting loose.

The present invention has arisen to mitigate and/or obviate the afore-described disadvantages.

SUMMARY OF THE INVENTION

The primary objective of the present invention is to provide a method for integrally forming a sole with hobnails, which enables the player to stably walk or swing the club, and the hobnails won't getting loose or fall off of the sole of the golf shoe.

Another objective of the present invention is to provide a method for integrally forming a sole with hobnails, which is capable of improving the gripping ability of the golf shoes.

A method for integrally forming a sole with hobnails in accordance with one aspect of the present invention comprises the following steps:

providing a mold assembly, the mold assembly including an injection mold and a shaping mold, the shaping mold including a sole forming member, and a hobnail forming member, the sole forming member being formed with a hobnail forming hole, around the hobnail forming hole being formed an arc-shaped rib, the hobnail forming member being placed into the hobnail forming hole in a manner that a mold cavity is defined between the injection mold and the shaping mold, the mold cavity including a hobnail forming portion between the injection mold and the hobnail forming member, and a sole forming portion between the injection mold and the sole forming member, the hobnail forming member being able to move with respect to the sole forming member within the hobnail forming hole;

forming of sole and hobnails, assembling the injection mold to the sole forming member and the hobnail forming member, injecting plastic material into the mold cavity to integrally form a sole and a hobnail which is integral with the sole;

demolding the hobnail, moving the hobnail forming member with respect to the sole forming member to move away from the hobnail, so as to create a buffer space between the hobnail and the hobnail forming member;

demolding of the sole, taking the sole with the hobnail obtained by the previous step out of the mold assembly, wherein an arc-shaped paw portion of the hobnail is bent through the buffer space and then demolded.

A method for integrally forming a sole with hobnails in accordance with another aspect of the present invention comprises the following steps:

providing a mold assembly, the mold assembly including an injection mold and a shaping mold, the shaping mold including a sole forming member, a first hobnail forming member and a second hobnail forming member, the sole forming member being formed with a hobnail forming hole, and around the hobnail forming hole being formed an arc-shaped rib, the first hobnail forming member being placed into the hobnail forming hole to create a mold cavity between the injection mold and the sole forming member and the first hobnail forming member, the mold cavity including a first hobnail forming portion between the injection mold and the first hobnail forming member, and a sole forming portion between the injection mold and the sole forming member, the first hobnail forming member being able to move with respect to the sole forming member within the hobnail forming hole;

forming of the sole and a first hobnail, assembling the injection mold 40 to the sole forming member and the first hobnail forming member, and injecting plastic material into the mold cavity to integrally form the sole and the first hobnail which is formed with an arc-shaped paw portion via the arc-shaped rib.

demolding of the first hobnail, moving the first hobnail forming member with respect to the sole forming member to move the first hobnail forming member away from the first hobnail and move out of the hobnail forming hole;

forming of a second hobnail, placing the second hobnail forming member into the hobnail forming hole to form a second hobnail forming portion between the injection mold and the second hobnail forming member, the second hobnail forming member being able to move with respect to the sole forming member within the hobnail forming hole, and injecting another plastic material into the second hobnail forming portion to form the second hobnail which is formed with an arc-shaped paw portion by using the arc-shaped rib.

demolding of the second hobnail, moving the second hobnail forming member with respect to the sole forming member to move the second hobnail forming member away from the second hobnail to create a buffer space between the second hobnail and the second hobnail forming member; and demolding of the sole, taking the sole with the hobnails obtained by the previous step out of the shaping mold, and the first and second hobnails being bent through the buffer space and then demolded.

The advantage of the method for integrally forming a sole with hobnails in accordance with the present invention is that: the hobnail forming member which is movable with respect to the sole forming member is able to integrally form the hobnail on the sole, so as to prevent the hobnail from falling off of the sole.

In addition, the hobnail is in the form of an arc-shaped paw, so as to improve gripping ability of the golf shoe.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
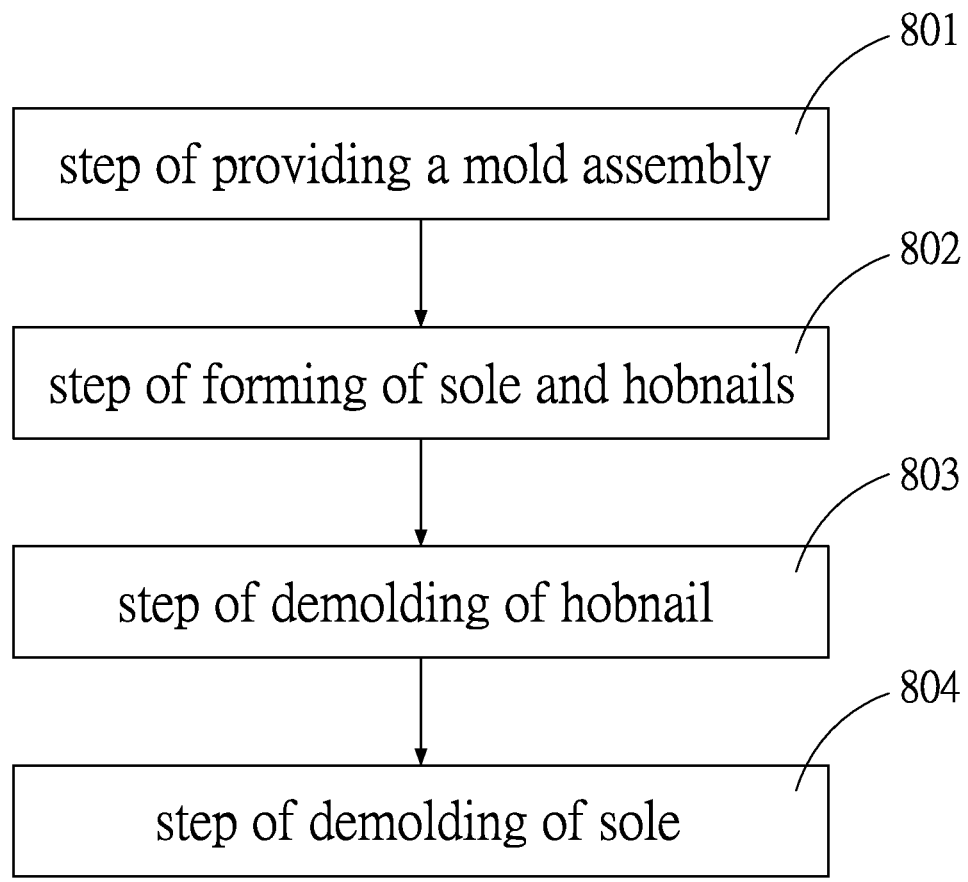
FIG. 1 is a flow chart showing a method for integrally forming a sole with hobnails in accordance with a first embodiment of the present invention.
Figure 2A:
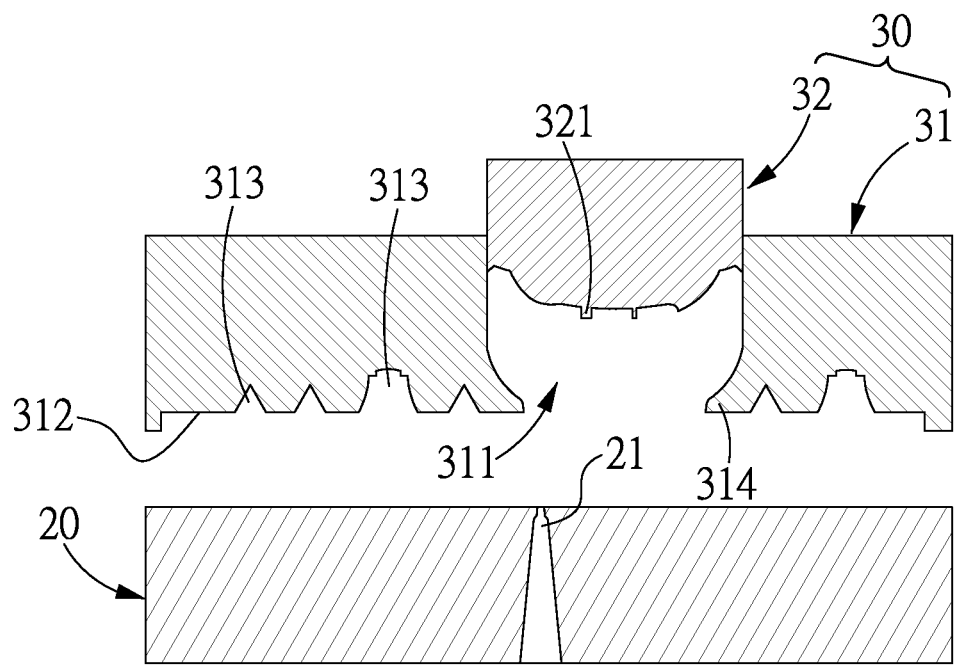
FIG. 2A is an illustrative view of the method for integrally forming the sole with hobnails in accordance with the first embodiment of the present invention.

Referring to FIGS. 1-4, a method for integrally forming a sole with hobnails in accordance with a first embodiment of the present invention comprises the following steps:

A, step 801 of providing a mold assembly, as shown in FIG. 2A, the mold assembly 801 includes an injection mold 20 and a shaping mold 30. The injection mold 20 includes a sprue 21, and the shaping mold 30 includes a sole forming member 31, and a hobnail forming member 32. The sole forming member 31 is formed with a hobnail forming hole 311, on an operation surface 312 of the sole forming member 31 is formed a plurality of tread portions 313, and around the hobnail forming hole 311 is formed an arc-shaped rib 314 which is located on the operation surface 312 and extends toward the interior of the hobnail-forming hole 311. The hobnail forming member 32 is disposed in the hobnail forming hole 311 in a manner that a mold cavity 22 is defined between the injection mold 20 and the shaping mold 30. The mold cavity 22 includes a hobnail forming portion 221 between the injection mold 20 and the hobnail forming member 32, and a sole forming portion 222 between the injection mold 20 and the sole forming member 31. The hobnail forming member 32 is able to move with respect to the sole forming member 31 within the hobnail forming hole 311. The hobnail forming member 32 can be formed with a decoration pattern portion 321.

Figure 2B:
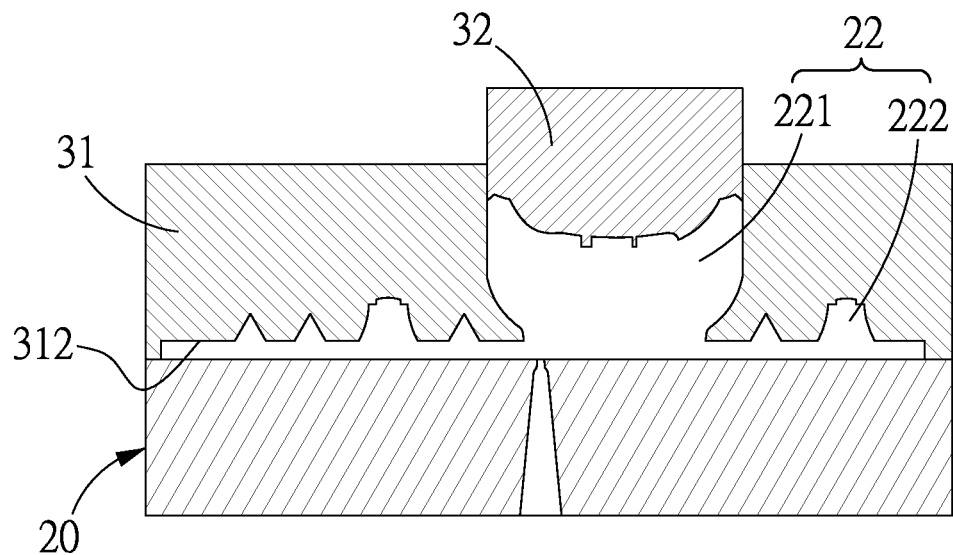
FIG. 2B is an illustrative view of the method for integrally forming the sole with hobnails in accordance with the first embodiment of the present invention.
Figure 2C:
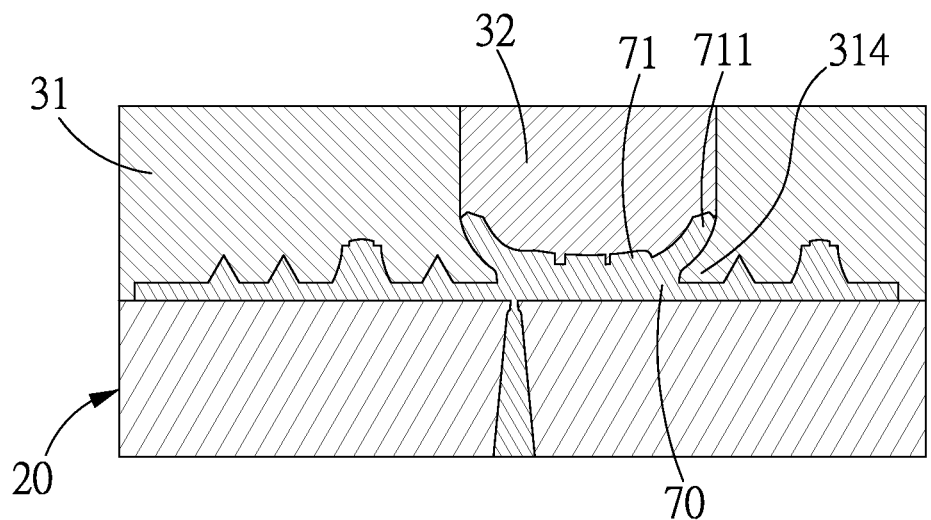
FIG. 2C is an illustrative view of the method for integrally forming the sole with hobnails in accordance with the first embodiment of the present invention.

B, a step 802 of forming of sole and hobnails, as shown in FIGS. 2B and 2C, assembling the injection mold 20 to the sole forming member 31 and the hobnail forming member 32, which means that the operation surface 312 of he sole forming member 31 is assembled to the injection mold 20, the hobnail forming member 32 is disposed in the hobnail forming hole 311 and creates a thickness from the operation surface 312 to hold plastic material for forming the hobnail 71. The plastic material is injected into the mold cavity 22 via the sprue 21 to integrally form a sole 70 and the hobnail 71 which is integral with the sole 70.

Figure 2D:
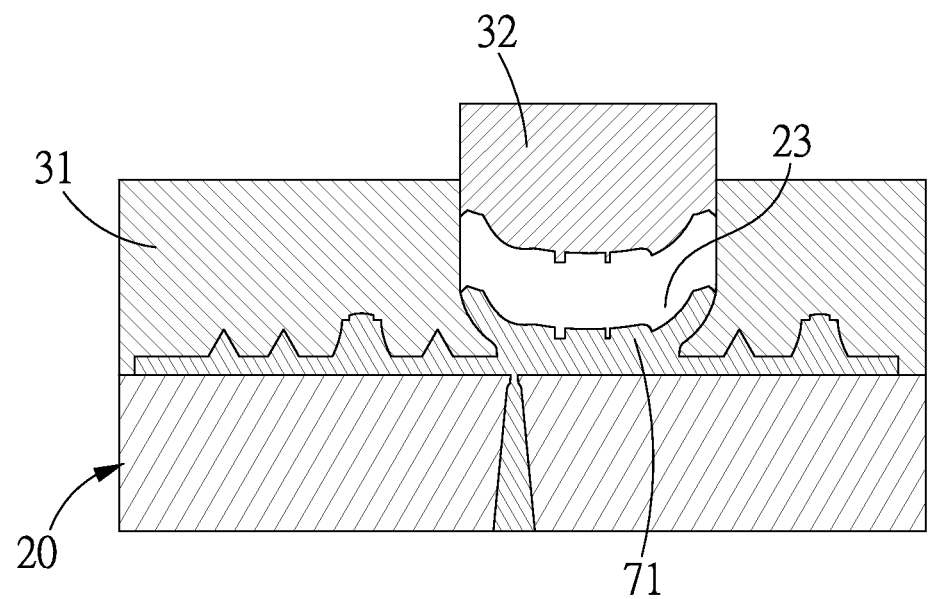
FIG. 2D is an illustrative view of the method for integrally forming the sole with hobnails in accordance with the first embodiment of the present invention.

C. a step 803 of demolding of hobnail: as shown in FIG. 2D, moving the hobnail forming member 32 with respect to the sole forming member 31 to move away from the hobnail 71, so as to create a buffer space 23 between the hobnail 71 and the hobnail forming member 32.

Figure 2E:
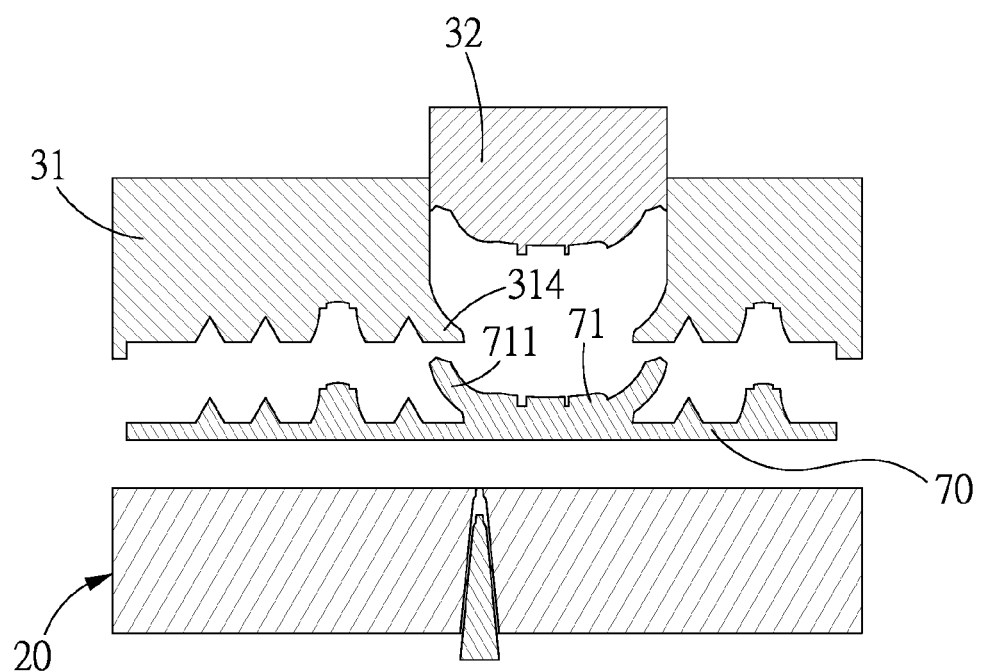
FIG. 2E is an illustrative view of the method for integrally forming the sole with hobnails in accordance with the first embodiment of the present invention.

D, a step 804 of demolding of sole: as shown in FIG. 2E, taking the sole 70 with the hobnail 71 obtained by the previous step out of the mold assembly, wherein the hobnail 71 includes an arc-shaped paw portion 711 which is engaged with the arc-shaped rib 314. It seems that the arc-shaped paw portion 711 is difficult to be taken out. However, the arc-shaped paw portion 711 has elasticity, and the hobnail forming member 32 has moved away from the hobnail 71 and leaved the buffer space 23 between the hobnail 71 and the hobnail forming member 32. Therefore, the hobnail 71 can be bent through the buffer space 23, and then demolded.

Figure 3:
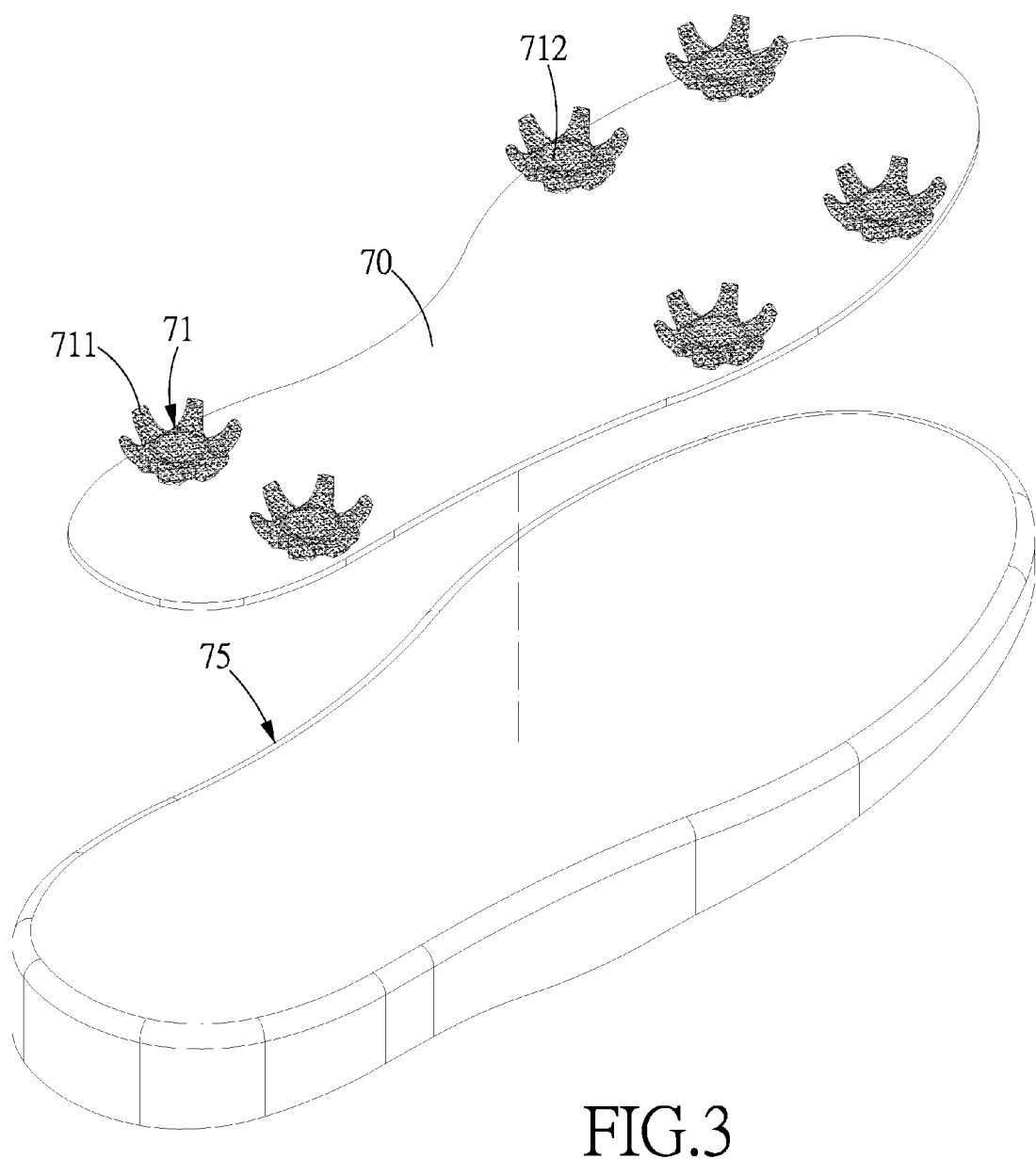
FIG. 3 is an exploded view of an upper and a sole formed by the method for integrally forming the sole with hobnails in accordance with the first embodiment of the present invention.
Figure 4:
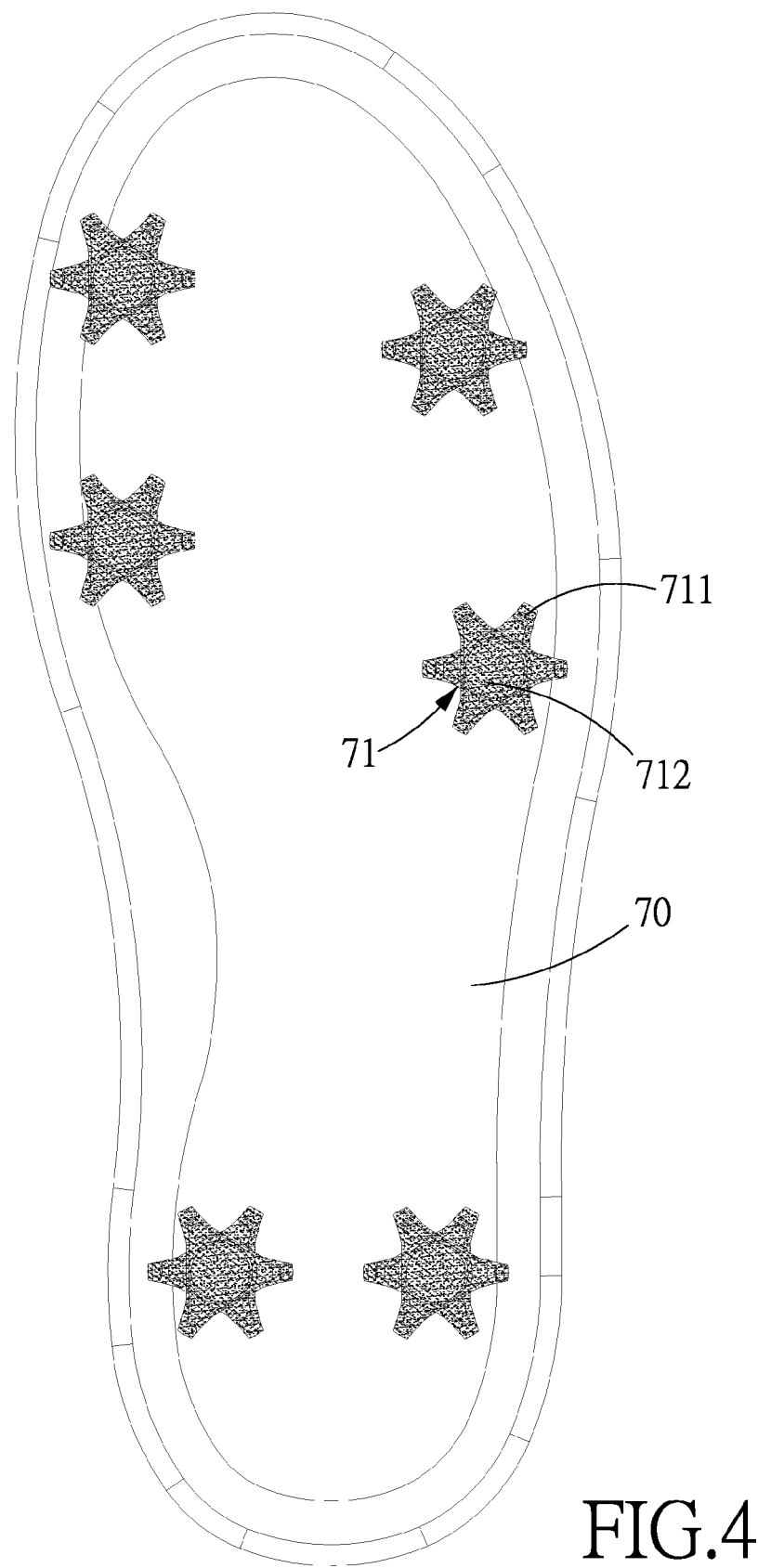
FIG. 4 is a bottom view of the sole formed by the method for integrally forming the sole with hobnails in accordance with the first embodiment of the present invention.

What mentioned above are the structures of the first embodiment of the present invention, for a better understanding of the invention, its operating advantages and the specific objects attained by its uses, reference should be had to the following descriptive matter and FIGS. 3 and 4. The sole 70 is assembled to an upper 75 to form a golf shoe. The hobnail 71 is integrally formed on the sole. Hence, the hobnail 71 won't fall out or break off whenever the player walks on the lawn or twists while swinging the club. In addition, the hobnail 71 includes the arc-shaped paw portion 711, which improves the gripping ability of the golf shoes.

The decoration pattern portion 321 of the hobnail forming member 32 and the tread portion 313 of the sole forming member 31 can be changed in shape as desired, to enable the formed hobnail 71 to have patterns. As shown in FIGS. 2-4, for example, the tread portion 313 is in the form of two protrusions of different sizes, which enables the hobnail 71 to have a big circular groove 712 and a small circular groove. The tread portion 313 can be triangular or irregularly shaped, as shown in FIGS. 2A-2E.

Figure 5:
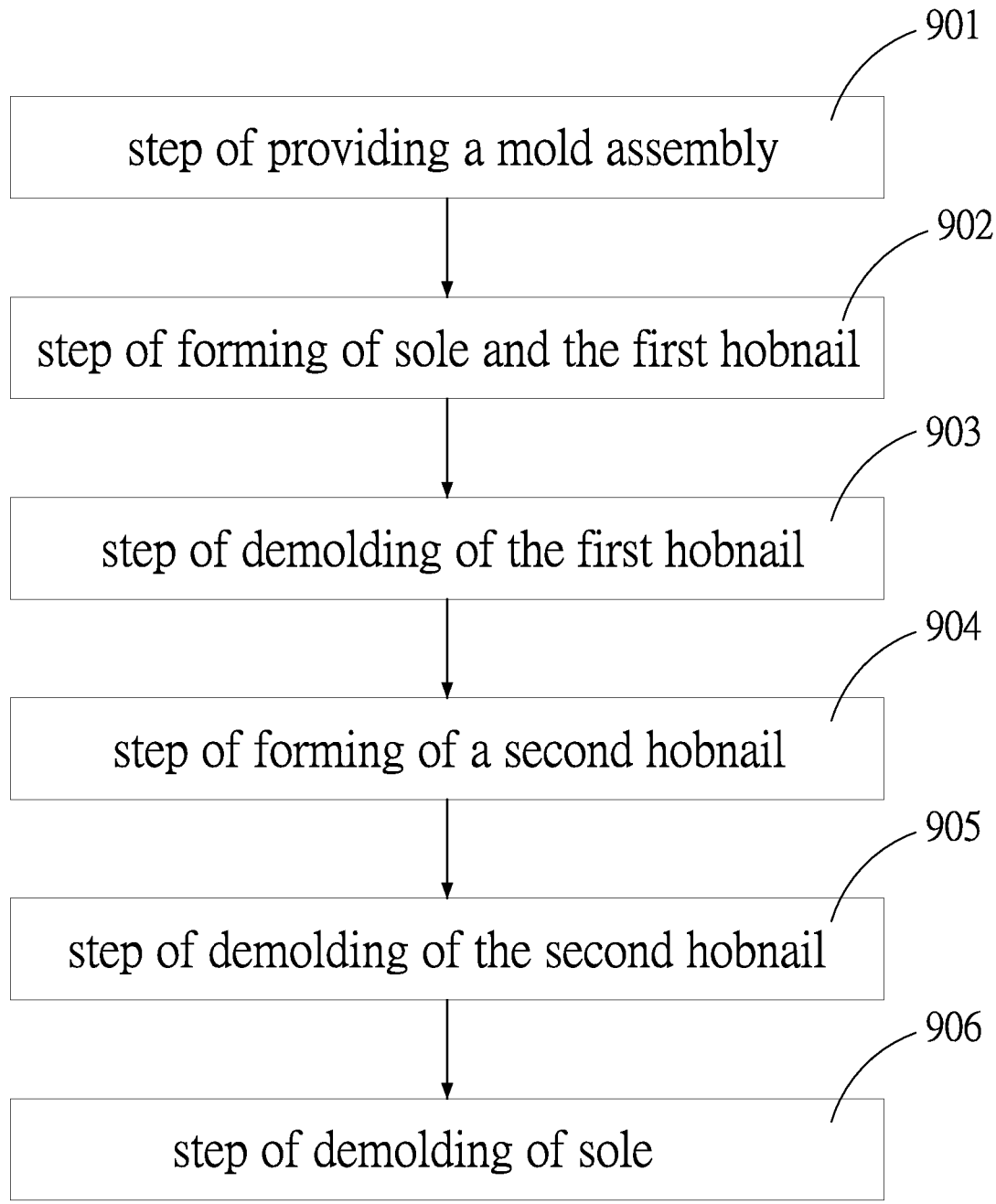
FIG. 5 is a flow chart showing a method for integrally forming a sole with hobnails in accordance with a second embodiment of the present invention.
Figure 6A:
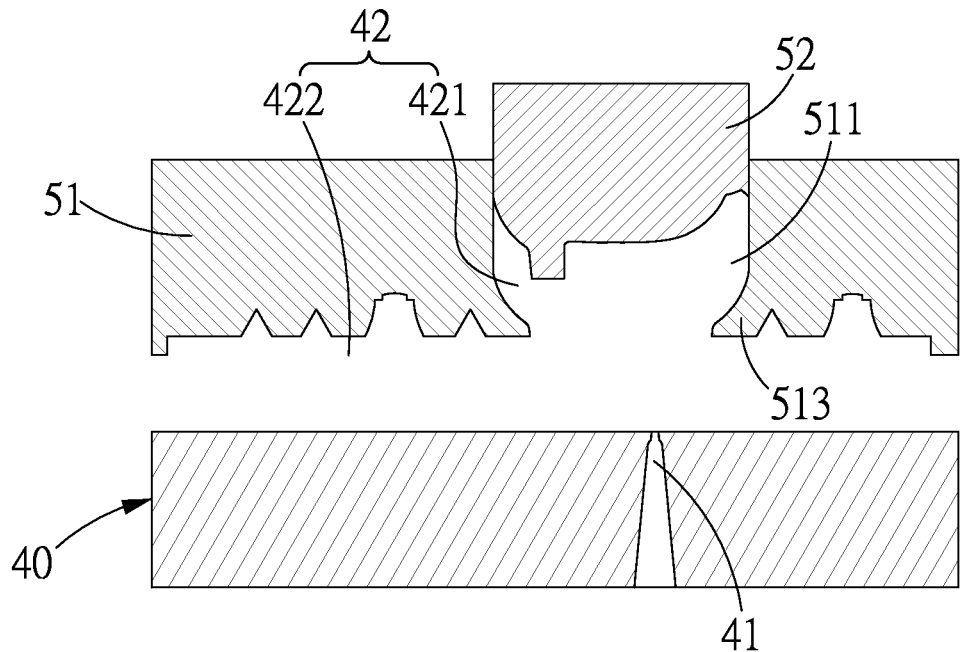
FIG. 6A is an illustrative view of the method for integrally forming the sole with hobnails in accordance with the second embodiment of the present invention.
Figure 6B:
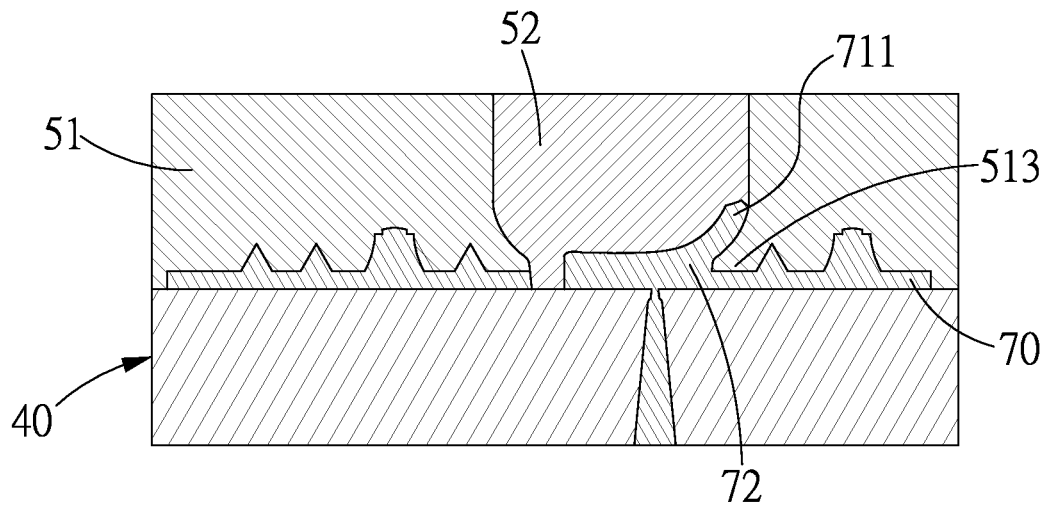
FIG. 6B is an illustrative view of the method for integrally forming the sole with hobnails in accordance with the second embodiment of the present invention.
Figure 6C:
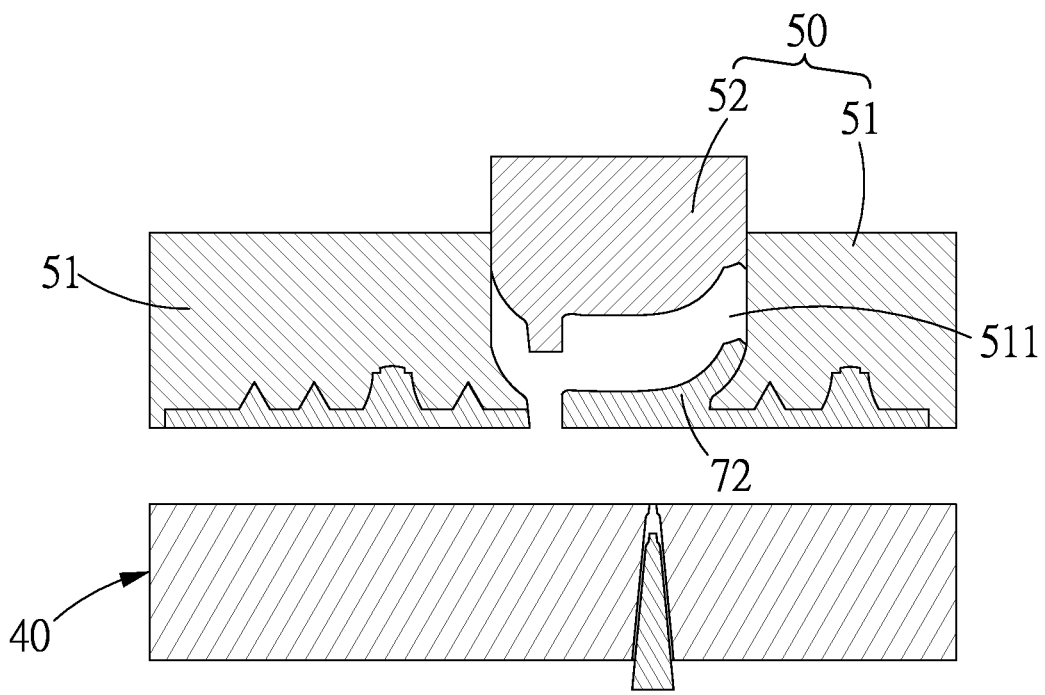
FIG. 6C is an illustrative view of the method for integrally forming the sole with hobnails in accordance with the second embodiment of the present invention.
Figure 6D:
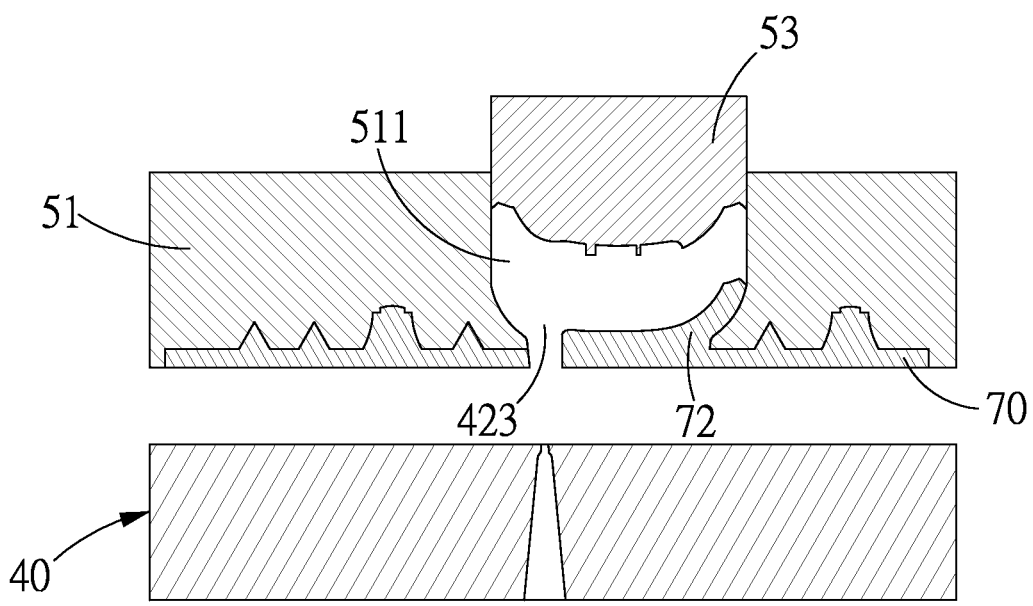
FIG. 6D is an illustrative view of the method for integrally forming the sole with hobnails in accordance with the second embodiment of the present invention.
Figure 6E:
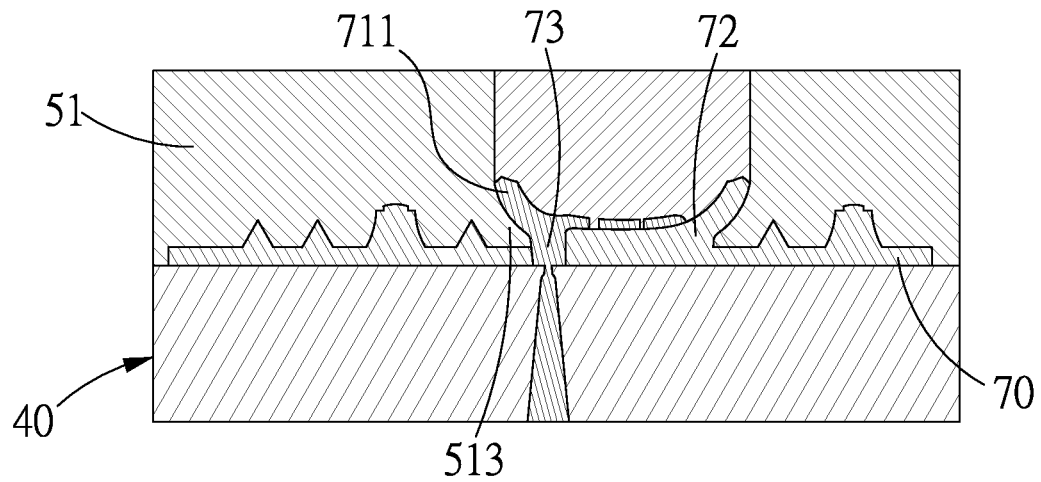
FIG. 6E is an illustrative view of the method for integrally forming the sole with hobnails in accordance with the second embodiment of the present invention.
Figure 6F:
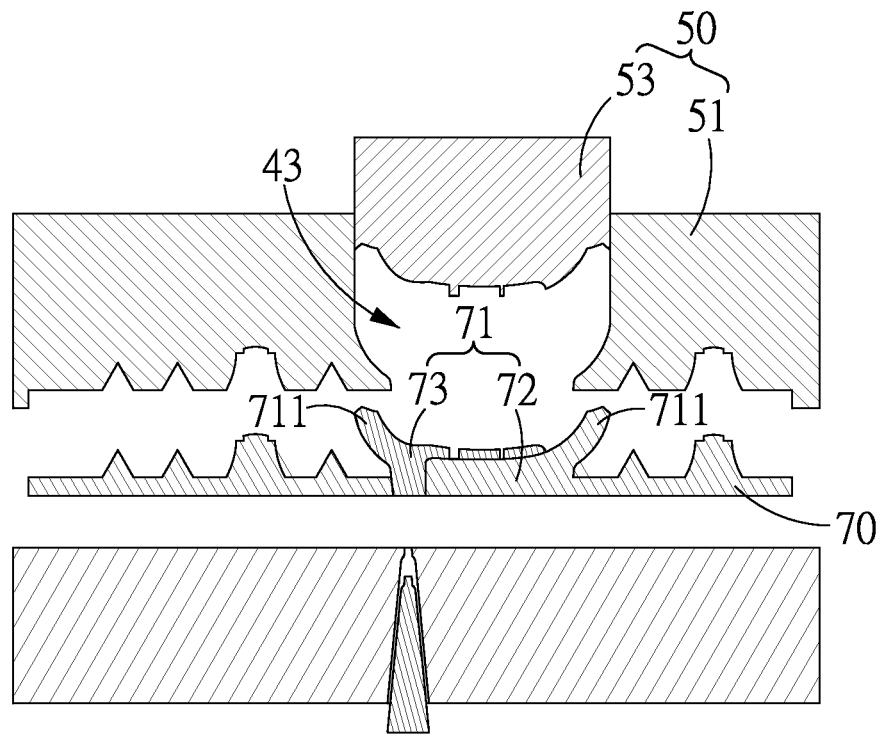
FIG. 6F is an illustrative view of the method for integrally forming the sole with hobnails in accordance with the second embodiment of the present invention.
Figure 7:
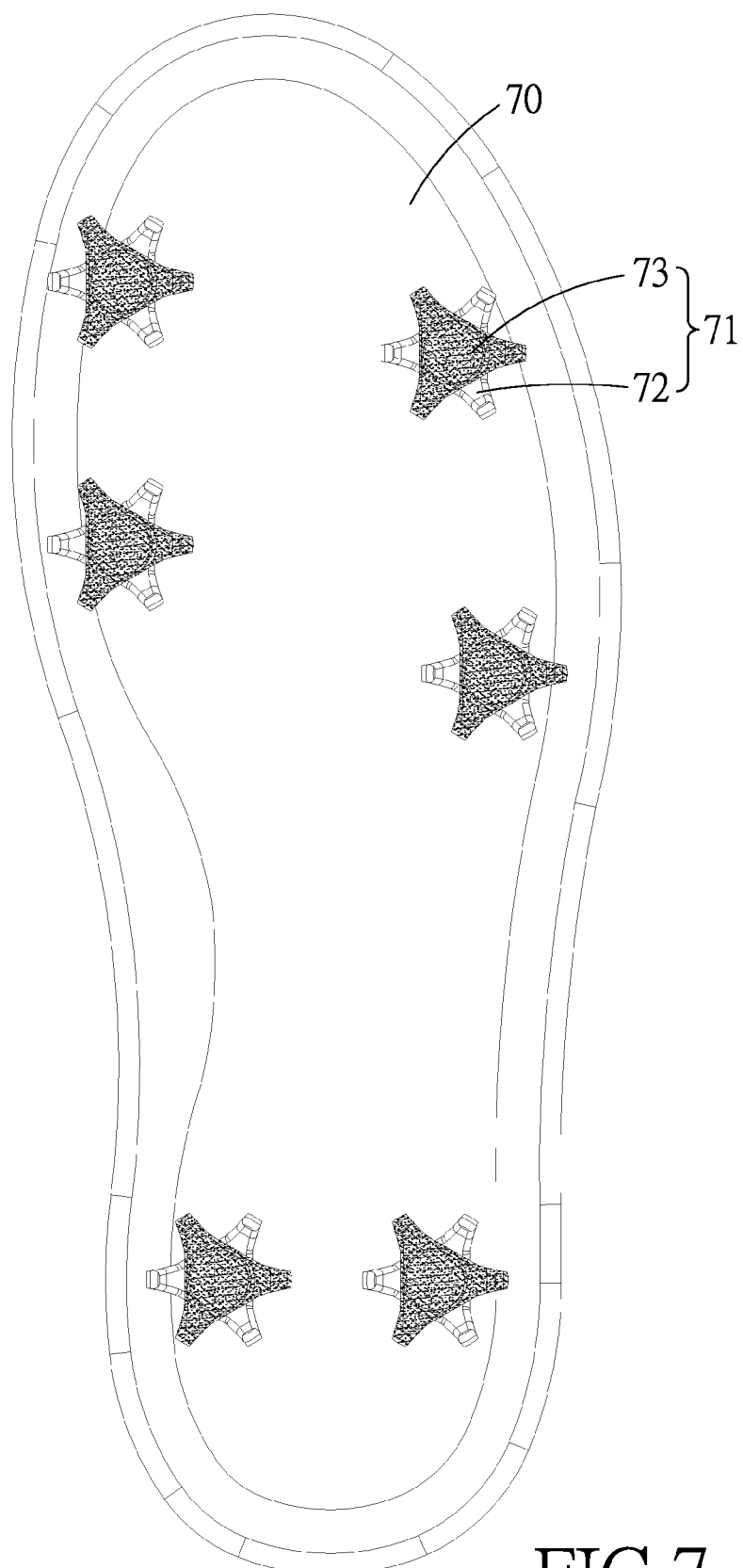
FIG. 7 is a bottom view of the sole formed by the method for integrally forming the sole with hobnails in accordance with the second embodiment of the present invention.

Referring then to FIGS. 5-7, a method for integrally forming a sole with hobnails in accordance with a second embodiment of the present invention comprises the following steps:

A, step 901 of providing a mold assembly, as shown in FIG. 6A, the mold assembly 901 includes an injection mold 40 and a shaping mold 50. The injection mold 40 includes a sprue 41, and the shaping mold 50 includes a sole forming member 51, a first hobnail forming member 52 and a second hobnail forming member 53. The sole forming member 51 is formed with a hobnail forming hole 511, and around the hobnail forming hole 511 is formed an arc-shaped rib 513. The first hobnail forming member 52 is disposed in the hobnail forming hole 511 in a manner that a mold cavity 42 is defined between the injection mold 40 and the sole forming member 51 and the first hobnail forming member 52. The mold cavity 42 includes a first hobnail forming portion 421 between the injection mold 40 and the first hobnail forming member 52, and a sole forming portion 422 between the injection mold 40 and the sole forming member 51. The first hobnail forming member 52 is able to move with respect to the sole forming member 51 within the hobnail forming hole 511.

B, a step 902 of forming of sole and the first hobnail, as shown in FIG. 6B, assembling the injection mold 40 to the sole forming member 51 and the first hobnail forming member 52, and plastic material is injected into the mold cavity 42 to integrally form the sole 70 and a first hobnail 72 which is formed with an arc-shaped paw portion 711 via the arc-shaped rib 513.

C1, a step 903 of demolding of the first hobnail: as shown in FIG. 6C, moving the first hobnail forming member 52 with respect to the sole forming member 51 to move away from the first hobnail 72 and move out of the hobnail forming hole 511;

C2, a step 904 of forming of a second hobnail: as shown in FIGS. 6D and 6E, placing the second hobnail forming member 53 into the hobnail forming hole 511 to form a second hobnail forming portion 423 between the injection mold 40 and the second hobnail forming member 53, wherein the second hobnail forming member 53 is able to move with respect to the sole forming member 51 within the hobnail forming hole 511, and another plastic material is injected into the second hobnail forming portion 423 to form the second hobnail 73 which is formed with an arc-shaped paw portion 711 via the arc-shaped rib 513.

C3, a step 905 of demolding of the second hobnail: as shown in FIG. 6F, moving the second hobnail forming member 53 with respect to the sole forming member 51 to move away from the second hobnail 73 to create a buffer space 43 between the second hobnail 73 and the second hobnail forming member 53; and D, a step 906 of demolding of sole: taking the sole 70 with the hobnail 71 obtained by the previous step out of the shaping mold 50, wherein the first and second hobnails 71, 73 can be bent through the buffer space 43, and then demolded.

It should be noted that, as shown in FIG. 7, the method in accordance with the second embodiment of the present invention can be used to produce a sole 70 integral with hobnails 71 of two different colors.

While we have shown and described various embodiments in accordance with the present invention, it is clear to those skilled in the art that further embodiments may be made without departing from the scope of the present invention.

What is claimed is:

1. A method for integrally forming a sole with hobnails comprising the following steps:
providing a mold assembly, the mold assembly including an injection mold and a shaping mold, the shaping mold including a sole forming member, and a hobnail forming member, the sole forming member being formed with a hobnail forming hole, around the hobnail forming hole being formed an arc-shaped rib, the hobnail forming member being placed into the hobnail forming hole in a manner that a mold cavity is defined between the injection mold and the shaping mold, the mold cavity including a hobnail forming portion between the injection mold and the hobnail forming member, and a sole forming portion between the injection mold and the sole forming member, the hobnail forming member being able to move with respect to the sole forming member within the hobnail forming hole;
forming of sole and hobnails, assembling the injection mold to the sole forming member and the hobnail forming member, injecting plastic material into the mold cavity to integrally form a sole and a hobnail which is integral with the sole;
demolding the hobnail, moving the hobnail forming member with respect to the sole forming member to move away from the hobnail, so as to create a buffer space between the hobnail and the hobnail forming member; and
demolding of the sole, taking the sole with the hobnail obtained by the previous step out of the mold assembly, wherein an arc-shaped paw portion of the hobnail is bent through the buffer space and then demolded.

2. A method for integrally forming a sole with hobnails comprising the following steps:
providing a mold assembly, the mold assembly including an injection mold and a shaping mold, the shaping mold including a sole forming member, a first hobnail forming member and a second hobnail forming member, the sole forming member being formed with a hobnail forming hole, and around the hobnail forming hole being formed an arc-shaped rib, the first hobnail forming member being placed into the hobnail forming hole to create a mold cavity between the injection mold and the sole forming member and the first hobnail forming member, the mold cavity including a first hobnail forming portion between the injection mold and the first hobnail forming member, and a sole forming portion between the injection mold and the sole forming member, the first hobnail forming member being able to move with respect to the sole forming member within the hobnail forming hole;
forming of the sole and a first hobnail, assembling the injection mold to the sole forming member and the first hobnail forming member, and injecting plastic material into the mold cavity to integrally form the sole and the first hobnail which is formed with an arc-shaped paw portion via the arc-shaped rib;
demolding of the first hobnail, moving the first hobnail forming member with respect to the sole forming member to move the first hobnail forming member away from the first hobnail and move out of the hobnail forming hole;
forming of a second hobnail, placing the second hobnail forming member into the hobnail forming hole to form a second hobnail forming portion between the injection mold and the second hobnail forming member, the second hobnail forming member being able to move with respect to the sole forming member within the hobnail forming hole, and injecting another plastic material into the second hobnail forming portion to form the second hobnail which is formed with an arc-shaped paw portion by using the arc-shaped rib;
demolding of the second hobnail, moving the second hobnail forming member with respect to the sole forming member to move the second hobnail forming member away from the second hobnail to create a buffer space between the second hobnail and the second hobnail forming member; and demolding of the sole, taking the sole with the hobnails obtained by the previous step out of the shaping mold, and the first and second hobnails being bent through the buffer space and then demolded.

\* \* \* \* \*